United States Patent [19]

Shimakawa et al.

[11] Patent Number: 5,792,718
[45] Date of Patent: Aug. 11, 1998

[54] COMPOUND MAGNETORESISTANCE EFFECT MATERIALS AND METHOD FOR MAKING THE SAME

[75] Inventors: Yuichi Shimakawa; Yoshimi Kubo; Takashi Manako, all of Tokyo, Japan

[73] Assignee: NEC Corporation, Tokyo, Japan

[21] Appl. No.: 684,936

[22] Filed: Jul. 19, 1996

[30] Foreign Application Priority Data

Jul. 20, 1995 [JP] Japan ................................ 7-228672
Dec. 22, 1995 [JP] Japan ................................ 7-334687

[51] Int. Cl.$^6$ ................................................ C03C 10/02
[52] U.S. Cl. ................................................ 501/152; 264/611
[58] Field of Search ................................ 501/3, 10, 126, 501/134, 151, 152, 906; 264/611

[56] References Cited

U.S. PATENT DOCUMENTS

| | | | |
|---|---|---|---|
| 4,176,094 | 11/1979 | Horowitz et al. | 252/518 |
| 4,902,651 | 2/1990 | Wada et al. | 501/87 |
| 5,068,050 | 11/1991 | Inomata et al. | 252/62.51 |
| 5,164,349 | 11/1992 | Fujii et al. | 501/134 |
| 5,411,814 | 5/1995 | Jin et al. | 428/692 |

OTHER PUBLICATIONS

Pp. 2472 to 2475 of "The American Physical Society", vol. 61, No. 21, 21 Nov. 1998.
Pp. 3061 to 3064 of "Journal of the Physical Society of Japan" vol. 59, No.9, Sep. 1990.
Pp. 1021 to 1024 to "Science", vol. 261, 20 Aug. 1993.
Pp. 2023 to 2031 of "Canadian Journal of Physics", vol. 48, 1970.

*Primary Examiner*—Peter Chin
*Assistant Examiner*—Sean Vincent
*Attorney, Agent, or Firm*—Young & Thompson

[57] ABSTRACT

A compound magnetoresistance effect material which is an oxide containing thallium(Tl) and manganese(Mn); wherein the oxide has a composition of $Tl_2Mn_2O_y$, where y represents seven or a value near to seven which varies depending on a combination of components of the oxide, a composition ratio between the components and conditions in synthesis of the oxide and has a pyrochlore structure.

2 Claims, 1 Drawing Sheet

COMPOUND MAGNETORESISTANCE EFFECT MATERIALS AND METHOD FOR MAKING THE SAME

FIELD OF THE INVENTION

This invention relates to compound magnetoresistance effect materials, and more particularly to, compound magnetoresistance effect materials used for magnetic detection devices such as a magnetic read head, a magnetic sensor, and a method for making the same.

BACKGROUND OF THE INVENTION

The magnetoresistance effect is a property of magnetic materials that the electric resistivity changes according to the change of applied magnetic field. The magnetic detection devices is using this effect include a magnetic read head, a magnetic sensor etc. The magnetoresistance effect materials for the magnetic detection device include, for example, permalloy with anisotropic magnetoresistance effect.

Recently, metal superlattices that have the multilayer structure composed of a ferromagnetic layer and a non-magnetic layer such as Fe/Cr, or qranular-type monolayer film that magnetic metal is crystallized in non-magnetic metal has been researched and developed.

On the other hand, the recording density of magnetic recording media has been increased and will further be increased. Therefore the magnetic signal output from the magnetic recording medium trends to be weakened with the increase in recording density. To sensitively detect the weakened magnetic signal from the high-density magnetic recording medium, a high-sensitivity magnetic detection device is needed.

In the case of using the magnetoresistance effect, desired is the material that the electric resistivity is changed as much as possible to the change of the magnetic field applied. However, the conventional magnetoresistance effect material, permalloy has only the change of electric resistivity of several percent at the most, which is insufficient for the high-density magnetic recording. Also, in the metal superlattices and granular-type monolayer film the sufficient change of electric resistivity has not been obtained.

Thus, to realize the high-sensitivity magnetic detection device to sensitively detect the weakened magnetic signal, large magnetoresistance effect materials are desired.

SUMMARY OF THE INVENTION

Accordingly, it is an object of the invention to provide compound magnetoresistance effect materials which show the change of electric resistivity larger than that of the conventional magnetoresistance material.

It is a further object of the invention to provide a method for making the compound magnetoresistance effect materials.

According to the invention, a compound magnetoresistance effect material, comprises;

an oxide containing thallium(Tl) and manganese(Mn);

wherein the oxide has a composition of $Tl_2Mn_2O_y$ where y represents seven or a value near to seven which varies depending on a combination of components of the oxide, a composition ratio between the components and conditions in synthesis of the oxide and has a pyrochlore structure.

Namely, the compound magnetoresistance effect material contains:

(1) first metal M which is one or more elements selected from the group consisting of thallium(Tl), bismuth(Bi), lead(Pb), iridium(Ir), yttrium(Y), indium(In), tin(Sn), antimony(Sb), lanthanum(La) and lanthanoids;

(2) second metal n which is a) manganese(Mn) or b) metal which a part or all of manganese is replaced with at least one of 3d, 4d and 5d group transition metals; and (3) non-metals Z which is a) oxygen or b) non-metal element in which a part of oxygen is replaced with at least one of hydroxyl group(OH), fluorine(F), boron (B), chlorine(Cl), bromine(Br), sulfur(S), selenium(Se) and tellurium(Te), wherein the material has a composition of $M_2m_3Z_y$, where y represents seven or a value near to seven which varies depending on a combination of components of the oxide, a composition ratio between the components and conditions in synthesis of the material and has a pyrochlore structure.

According to another aspect of the invention, a method for making a compound magnetoresistance effect material which has a composition of $M_2m_2Z_y$, where Z represents non-metals containing oxygen or oxygen and other elements and y represents a value near to seven which varies depending on conditions in synthesis of the material and has a pyrochlore structure, comprises the steps of:

mixing and sintering 1) first metal oxide($M_uO_v$) containing one or more oxides selected from the group consisting of thallium oxide, bismuth oxide, lead oxide, iridium oxide, yttrium oxide, indium oxide, tin oxide, antimony oxide, lanthanum oxide and lanthanoids oxide, 2) second metal oxide($m_wO_x$) containing a) at least one oxide of manganese oxide and 3d, 4d and 5d group transition metal oxides or b) manganese oxide and one or more of 3d, 4d and 5d group transition metal oxides.

Namely, the method comprises the steps of:

mixing and sintering 1) first metal oxide($M_uO_v$) which is one or more oxides of thallium oxide, bismuth oxide, lead oxide, iridium oxide, yttrium oxide, indium oxide, tin oxide, antimony oxide, lanthanum oxide and lanthanoids oxide, 2) second metal oxide($m_wO_x$) which is a) at least one oxide of manganese oxide, ruthenium oxide, osmium oxide and 3d, 4d and 5d group transition metal oxides or b) manganese oxide and one or more of 3d, 4d and 5d group transition metal oxides.

The inventor has found that the above compound magnetoresistance effect materials show a large change of electric resistivity to a change of magnetic field. The compound magnetoresistance effect materials of the invention show magnetic transition front ferromagnetic to paramagnetic state. Above the magnetic transition temperature, the interaction between magnetic spins in transition metals such as manganese is weak and the property is in the state of paramagnetic.

On the other hand, below the magnetic transition temperature, the magnetic spins are aligned and the property is shifted to show electric conductivity like metal. Observing the change of electric resistivity to the change of temperature, the electric resistivity which increases with the decrease in temperature, for example, with the temperature drop from about 500° K is rapidly reduced below the magnetic transition temperature where the magnetic spins are aligned to establish metallic phase, thereafter showing the electric conductivity like metal.

Here, it is considered that the magnetic spins are not perfectly aligned near the magnetic transition temperature. In this stage, by applying an external magnetic field, the magnetic spins can be aligned to reduce the electric resistivity.

This it the magnetoresistance effect provided by the compound magnetoresistance effect materials of the invention. For example, it is proved that the magnetoresistance effect more than about 50% is obtained comparing to the case that the external magnetic field is not applied when the external magnetic field more than 5 tesla is applied.

As mentioned above, the compound magnetoresistance effect materials of the invention utilizes the magnetoresistance effect near at the magnetic transition temperature. However, by modifying the combination of components and the composition ratio therebetween, the magnetic transition temperature can be widened. Therefore, the magnetoresistance effect in the wider range of temperature can be realized, thereby providing a magnetic detection device applicable for various temperature conditions.

In the above composition formula, y represents the amount of oxygen, for example, in the oxide. The value y may be changed due to the sintering conditions, i.e., sintering temperature, time and atmosphere, the combination of components and the composition ratio therebetween.

For example, the material sintered in oxygen has generally a value y more than that sintered in argon or nitrogen. The value y is concerned with the carrier concentration controlling the electric conduction. Therefore, controlling the value y by the sintering conditions, the absolute value of the standard electric resistivity can be changed.

BRIEF DESCRIPTION OF THE DRAWINGS

The invention will be explained in more detail in conjunction with the appended drawing, wherein.

DESCRIPTION OF THE PREFERRED EMBODIMENTS

Figure 1:
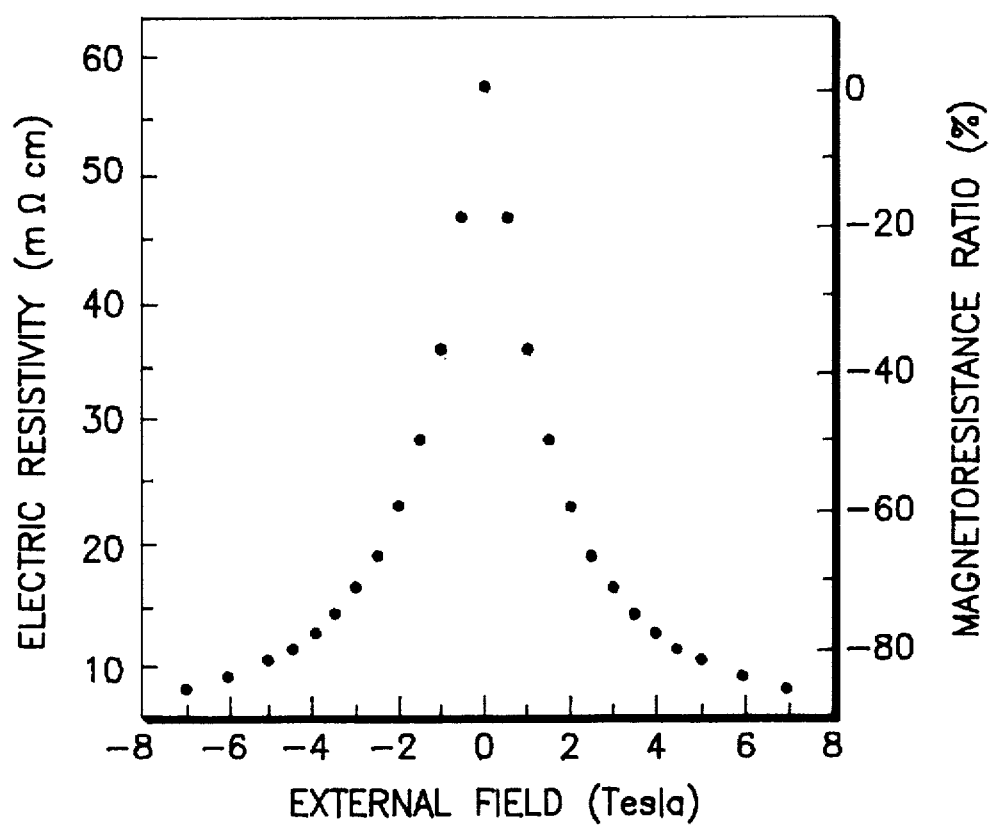
FIG. 1 is a graph showing the magnetoresistance property of a compound magnetoresistance effect material in a preferred embodiment according to the invention.

Compound magnetoresistance effect materials in the preferred embodiments will be explained.

The compound magnetoresistance effect materials with pyrochlore structure and the composition: $Tl_2Mn_2O_y$, are synthesized as ceramics by sintering after mixing rat powder materials or by grinding and mixing after calcinating the raw materials and further sintering them.

Furthermore, the synthesized material may be melted at a high temperature to obtain single crystal material by crystallization or floating zone method.

Depending on the combination of raw materials, the synthesis under high pressure higher than 2 GPa(20 kbar) may be effective since they may contain at non-equilibrium material under the atmospheric pressure. Using the ceramics or single crystal material obtained as above, thin film may be formed on a substrate by the sputtering method, laser depositions (laser abrasion) or molecular beam epitaxy method. In particular, when the magnetic detection device is applied to magnetic read head device, the formation of thin film is more advantageous to miniaturize and easily process it.

EXAMPLE 1

The compound magnetoresistance effect material in the first embodiment will be explained below.

The raw materials, thallium oxide($Tl_2O_2$) and manganese oxide($MnO_2$) are weighed to obtain the molar ratio of Tl:Mn=1:1 and are mixed. After it is pressed to form into the predetermined shape, it is wrapped with gold foil and is sintered under pressure of 2.5 GPa, temperature of 1000° C. for 30 min. by using a high-pressure synthesis apparatus to obtain samples.

The crystal structure analysis by X-ray diffraction of the sample proves that it is the pyrochlore structure compound that contains manganese ion. Furthermore, by EPMA (electron probe micro-analyzer) analysis, it is proved that it has the composition of $Tl_2Mn_2O_7$.

To measure the magnetic resistance, terminals for supplying current and for measuring voltage are attached to the sample. The magnetic resistance is measured on the output voltage to an input current when an external magnetic field is applied or not applied.

First, when the external magnetic field is not applied, the electric resistivity of the sample is about 70 mΩcm near at room temperature. From about 150° K, the electric resistivity begins to be reduced, showing the electric conduction like metal below the temperature, where the resistivity is reduced to a few mΩcm. The temperature where the electric resistivity is greatly changed is nearly equal to the temperature that the magnetic transition from paramagnetic to ferromagnetic state occurs.

Next, when the external magnetic field is applied at 13520 K, the electric resistivity of 60 mΩcm is, as shown in FIG. 1, reduced with the increase in magnetic field, showing about 8 mΩcm at the external magnetic field of 7 tesla. Comparing this value with the resistivity when the external magnetic field is not applied, the variation therebetween is about −87%.

This is significantly greater than the variation of electric resistivity that is observed in a material showing the anisotropic magnetoresistance effect such as permalloy or observed in metal superlattices.

EXAMPLE 2

The compound magnecoresistance effect material in the second embodiment will be explained below.

The raw materials, yttrium oxide($Y_{23}$) and manganese oxide($MnO_2$) are weighed to obtain the molar ratio of Y:Mn=1:1 and are mixed. By the process similar to the first embodiment, where the materials are sintered at 950° C. for 8 hours in oxygen or argon current, samples; are prepared. The crystal structure analysis of the sample by X-ray diffraction proves that it is the pyrochlore structure compound.

The sample sintered in the oxygen atmosphere has the electric resistivity of about 1 Ωcm near at room temperature when the external magnetic field is not applied. The electric resistivity is greatly changed near at 100° K, where when the external magnetic field of 6 tesla is applied the magnetoresistance effect of about −50% is obtained comparing to the case that the external magnetic field is not applied.

On the other hand, the sample sintered in the argon atmosphere, which has the amount of oxygen less than that of the sample sintered in the oxygen atmosphere, has the electric resistivity of 3 Ωcm near at room temperature. In this sample, when the external magnetic field of 6 tesla is applied near at 70° K, the magnetoresistance effect of about −60% is obtained comparing to the case that the external magnetic field is not applied.

EXAMPLE 3

The compound magnetoresistance effect material in the third embodiment will be explained below.

The raw materials, bismuth oxide($Bi_2O_3$), lead oxide (PbO) and ruthenium oxide($RuO_2$) are weighed to obtain the molar ratio of Bi:Pb:Ru=1:1:2 and are mixed. By the process similar to the first embodiment, where the materials are sintered at 930° C. for 5 hours, samples are prepared. The crystal structure and composition analysis of the sample proves that it is the pyrochlore structure compound and has the composition expressed as $(Bi,Pb)Ru_2O_7$.

In this sample, when the external magnetic field of 6 tesla is applied near at 100° K, the magnetoresistance effect of about 50% is obtained comparing to the case that the external magnetic field is not applied.

EXAMPLE 4

The compound magnetoresistance effect material in the fourth embodiment will be explained below.

The raw materials, lutetium oxide($Lu_2O_3$) and osmium oxide($OsO_4$) are weighed to obtain the molar ratio of Lu:Os=1:1 and are mixed. By the process similar to the first embodiment, where the materials are sintered at 900° C. for 3 hours, samples are prepared. The pyrochlore structure compound obtained is pelletized to use as a target for the laser deposition. Then, it is deposited on a strontium titanate ($SrTiO_3$) substrate to obtain pyrochlore structure compound $Lu_2Os_2O_7$ single crystal film.

In this sample, when the external magnetic field is not applied, the electric resistivity of the sample is about 50 m$\Omega$cm near at room temperature. On the other hand, when the external magnetic field of 6 tesla is applied near at 100° K, the magnetoresistance effect of about −80% is obtained comparing to the case that the external magnetic field is not applied.

EXAMPLE 5

The compound magnetoresistance effect material in the fifth embodiment will be explained below.

The raw materials, iridium oxide($IrO_2$) and manganese oxide(MnO) are weighed to obtain the molar ratio of Ir:Mn=1:1 and are mixed. By the process similar to the first embodiment, where the materials are sintered at 1000° C. for 10 hours, samples are prepared. It is proved that the sample is the pyrochlore structure compound containing manganese ion.

The samples are processed to form into sticks with diameter of 1cm and are then melted at temperature of about 1800° C. by the floating zone method. Thereafter they are crystalized to obtain pyrochlore structure compound ($Ir_2Mn_2O_2$) single crystal containing manganese ion.

In this sample, when the external magnetic field is not applied, the electric resistivity of the sample is about 50 m$\Omega$cm near at room temperature. On the other hand, when the external magnetic field of 6 tesla is applied near at 120° K, the magnetoresistance effect of about −80% is obtained comparing to the case that the external magnetic field is not applied.

EXAMPLE 6

The compound magnetoresistance effect material in the sixth embodiment will be explained below.

The raw materials, indium oxide($In_2O_3$) and manganese oxide($MnO_2$) are weighed to obtain the molar ratio of In:Mn=1:1 and are mixed. After it is pressed to form into the predetermined shape, it is sintered under pressure of 2.5 GPa, temperature of 1000° C. for 30 min. by using the high-pressure synthesis apparatus to obtain samples.

The crystal structure analysis by X-ray diffraction of the sample proves that it is the pyrochlore structure compound that contains manganese ion. Furthermore, by EPMA (electron probe micro-analyzer) analysis, it is proved that it has the composition of $In_2Mn_2O_7$.

In this sample, when the external magnetic field is not applied, the electric resistivity of the sample is about 500 $\Omega$cm near at room temperature. On the other hand, when the external magnetic field of 7 tesla is applied near at 140° K, the magnetoresistance effect of about −85% is obtained comparing to the case that the external magnetic field is not applied.

Alternatively, in the first embodiment, a part or all of thallium may be replaced with tin(Sn) or antimony(Sb). The sample obtained also shows large magnetoresistance effect, i.e., the resistance when the external magnetic field is applied is significantly reduced compared to the case that the external magnetic field is not applied.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A magnetoresistance effect material, consisting essentially of $Tl_2Mn_2O_y$, wherein y is about 7, said material having a pyrochlore structure.

2. A method for making a magnetoresistance effect material having the composition $Tl_2Mn_2O_y$, wherein y is about 7, said material having a pyrochlore structure, comprising the steps of mixing thallium oxide and manganese oxide, and sintering the mixture thus formed under a pressure of more than 2 GPa.

* * * * *